United States Patent [19]

Uchino

[11] Patent Number: 5,287,260
[45] Date of Patent: Feb. 15, 1994

[54] GTO RECTIFIER AND INVERTER

[75] Inventor: Hiroshi Uchino, Tokyo, Japan

[73] Assignee: Kabushiki Kaisha Toshiba, Kawasaki, Japan

[21] Appl. No.: 964,075

[22] Filed: Oct. 21, 1992

[30] Foreign Application Priority Data

Oct. 21, 1991 [JP] Japan ............................ 3-272908
Oct. 28, 1991 [JP] Japan ............................ 3-280258

[51] Int. Cl.⁵ .................. H02M 7/155; H02M 7/515
[52] U.S. Cl. .................................... 363/58; 363/37; 363/129; 363/138
[58] Field of Search .................. 363/37, 54, 58, 129, 363/138; H02M 5/44, 7/155, 7/48, 7/515

[56] References Cited

U.S. PATENT DOCUMENTS

| 4,566,051 | 1/1986 | Komulainen . |
| 4,721,897 | 1/1988 | Matsuse et al. ............... 363/37 |
| 5,053,940 | 10/1991 | Peppel ..................... 363/58 |

FOREIGN PATENT DOCUMENTS

| 278452 | 5/1990 | Fed. Rep. of Germany ......... H02M 7/48 |
| 62-15023 | 4/1987 | Japan . |
| 1-198277 | 8/1989 | Japan ........................ H02M 7/155 |
| 1524148 | 11/1989 | U.S.S.R. ..................... H02M 7/515 |
| 1690135 | 11/1991 | U.S.S.R. ..................... H02M 7/48 |
| 1162555 | 8/1969 | United Kingdom ............... 363/138 |

Primary Examiner—William H. Beha, Jr.
Attorney, Agent, or Firm—Oblon, Spivak, McClelland, Maier & Neustadt

[57] ABSTRACT

A power converting apparatus controls switching of self turn-off type semiconductor devices so as to perform power conversion. The apparatus comprises a plurality of switch units each having first and second self turn-off type semiconductor devices, first and second diodes, and a capacitor. The cathode of the first self turn-off type semiconductor device is connected to the anode of the first diode, and the cathode of the second diode is connected to the anode of the second self turn-off type semiconductor device. The capacitor is connected between a common junction between the cathode of the first self turn-off type semiconductor device and the anode of the first diode and a common junction between the cathode of the second diode and the anode of the second self turn-off type semiconductor device.

19 Claims, 13 Drawing Sheets

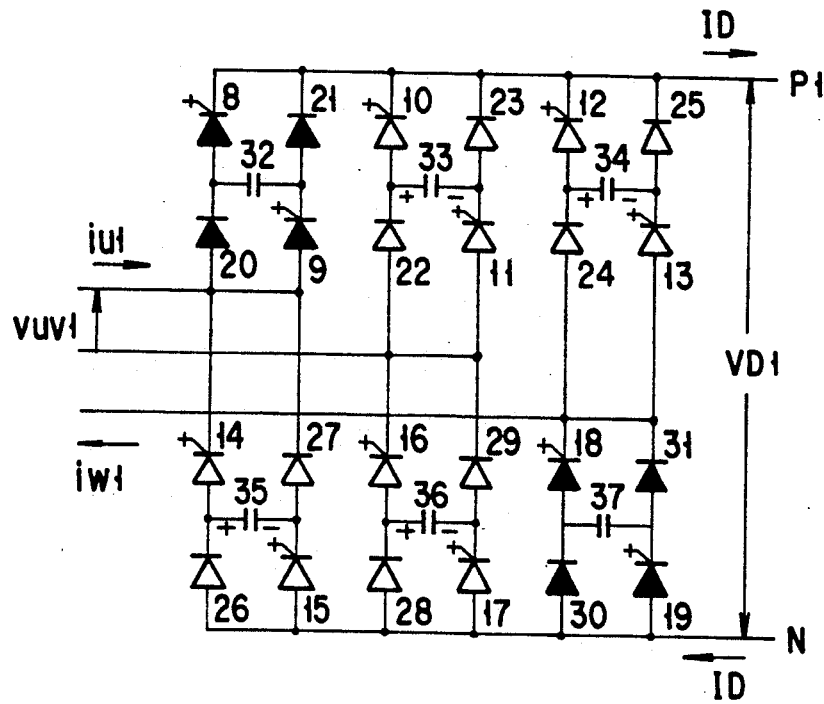
F I G. 4
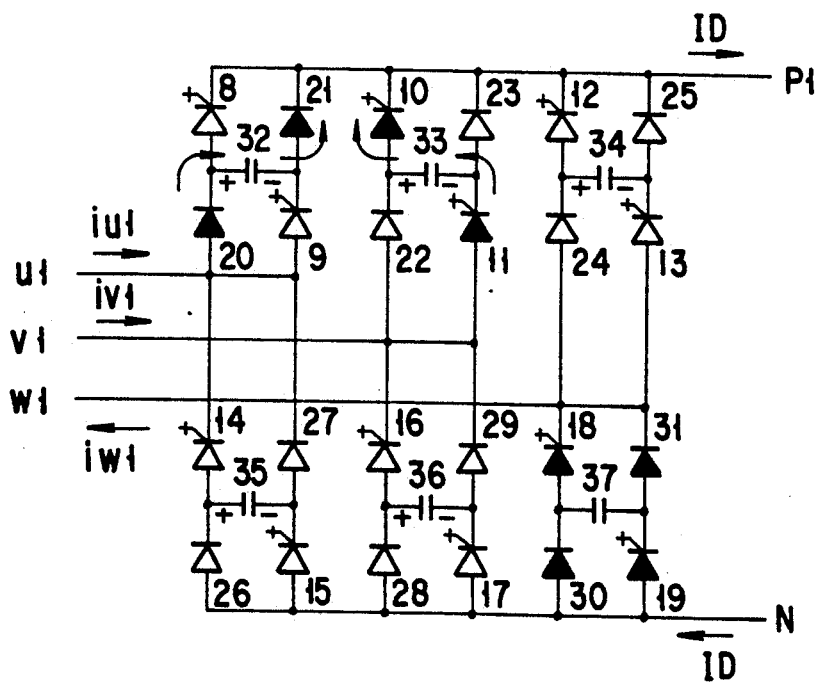
F I G. 5

GTO RECTIFIER AND INVERTER

BACKGROUND OF THE INVENTION

1. Field of the Invention

This invention relates to a power converting apparatus using self turn-off type semiconductor devices.

2. Description of the Related Art

FIG. 21 is a circuit diagram, showing a conventional power converting apparatus. In this apparatus, an AC voltage supplied from a first AC system 1 is transformed by a first transformer 2, and the transformed voltage is applied to a first converter 3A, where it is converted to a DC voltage.

The first converter 3A has self turn-off type semiconductor devices, e.g., gate turn-off thyristor (hereinafter referred to as "GTO") switches 69-74, and di/dt suppressor circuits 75-80 connected in series to the switches 69-74, respectively. Each of the GTO switches 69-74 consists of a GTO 93, diodes 94 and 95, a capacitor 96, and a resistor 97. Each of the suppressor circuits 75-80 consists of a diode 99, a resistor 100, and a reactor 98.

The DC voltage obtained by the converter 3A is smoothed by a capacitor 68, and is converted again to an AC by a second converter 5A, and is applied to a second AC system 7 after being transformed by a second transformer 6.

Like the first converter 3A, the second converter 5A consists of GTO switches 81-86 and di/dt suppressor circuits 87-92 connected to the switches. Each element has a structure similar to that of the first converter 3A.

In the structure as above, the diode 94 serves as a free-wheel diode for feeding back a circuit current obtained when the GTO switch 72 is turned off. The diode 95 serves to guide a current, having been flowing through the GTO 93 before the GTO 93 was turned off to the capacitor 96.

The capacitor 96 serves as a so-called snubber condenser for suppressing below an allowable value the rate dv/dt of the increase of the forward voltage of the GTO 93 which will occur as a result of turn off thereof. The resistor 97 is discharge resistor which relieves the charge of the capacitor 96 when the GTO 93 is turned on. These elements 93-97 constitutes the GTO switch 69.

The reactor 98 suppresses below an allowable value the rate di/dt of the increase of the forward current of the GTO 93 which will occur as a result of turn on thereof. The diode 99 serves to guide a current, having been flowing through the reactor 98 before the GTO 93 was turned off, to the resistor 100. The electromagnetic energy trapped by the reactor 98 is consumed by the resistor 100.

The above-described conventional device, however, has the following disadvantages:

(1) The charges of the capacitor 96 charged when the GTO 93 is in the off-state, will be discharged by the resistor 97 when the GTO 93 is turned on, resulting in heat loss. Thus, the efficiency of the power converting apparatus is deteriorated.

(2) The current flowing through the reactor 98 when the GTO 93 is turned on, is discharged by the resistor 100 when the GTO 93 is turned off, resulting in heat loss. Thus, the efficiency of the power converting apparatus is deteriorated.

(3) For example, if the GTO switch 72 is erroneously turned on where the GTO switch 69 is in the on-state, the DC circuit will short. Thus, it is difficult to protect the apparatus from excessive current. The apparatus must have a complicated structure.

SUMMARY OF THE INVENTION

The invention has been made to remove the above-described disadvantages, and aims to provide a power converting apparatus having a simple structure and high efficiency.

The power converting apparatus of the invention controls switching of self turn-off type semiconductor devices so as to perform power conversion, and employs a converter having a plurality of switch units. Each switch unit has first and second self turn-off type semiconductor devices, first and second diodes, and a capacitor. The cathode of the first self turn-off type semiconductor device is connected to the anode of the first diode, and the cathode of the second diode is connected to the anode of the second self turn-off type semiconductor device. The capacitor is connected between a common junction between the cathode of the first self turn-off type semiconductor device and the anode of the first diode and a common junction between the cathode of the second diode and the anode of the second self turn-off type semiconductor device.

In the invention constructed as above, the charge accumulated in the capacitor at the time of a phase current on the AC side being made 0 during commutation will be discharged to the AC side on the next occasion to flow the same phase current as above, which causes no dissipation and enhances the efficiency of the apparatus.

Further, when the self turn-off semiconductor device is turned off, the capacitor is connected to the self turn-off semiconductor device in parallel via the diode being in the on-state. Thus, the dv/dt applied to the semiconductor device can be minimized, with the result that the apparatus needs no snubber circuits and hence its main circuit can have a simple structure.

BRIEF DESCRIPTION OF THE DRAWINGS

FIG. 4 is a circuit diagram, useful in explaining commutation performed at the time of the AC/DC conversion in the embodiment of FIG. 1;

FIG. 5 is a circuit diagram, useful in explaining commutation performed at the time of the AC/DC conversion in the embodiment of FIG. 1;

DETAILED DESCRIPTION OF THE PREFERRED EMBODIMENTS

The embodiments of the invention will be explained with reference to the accompanying drawings.

Figure 1:
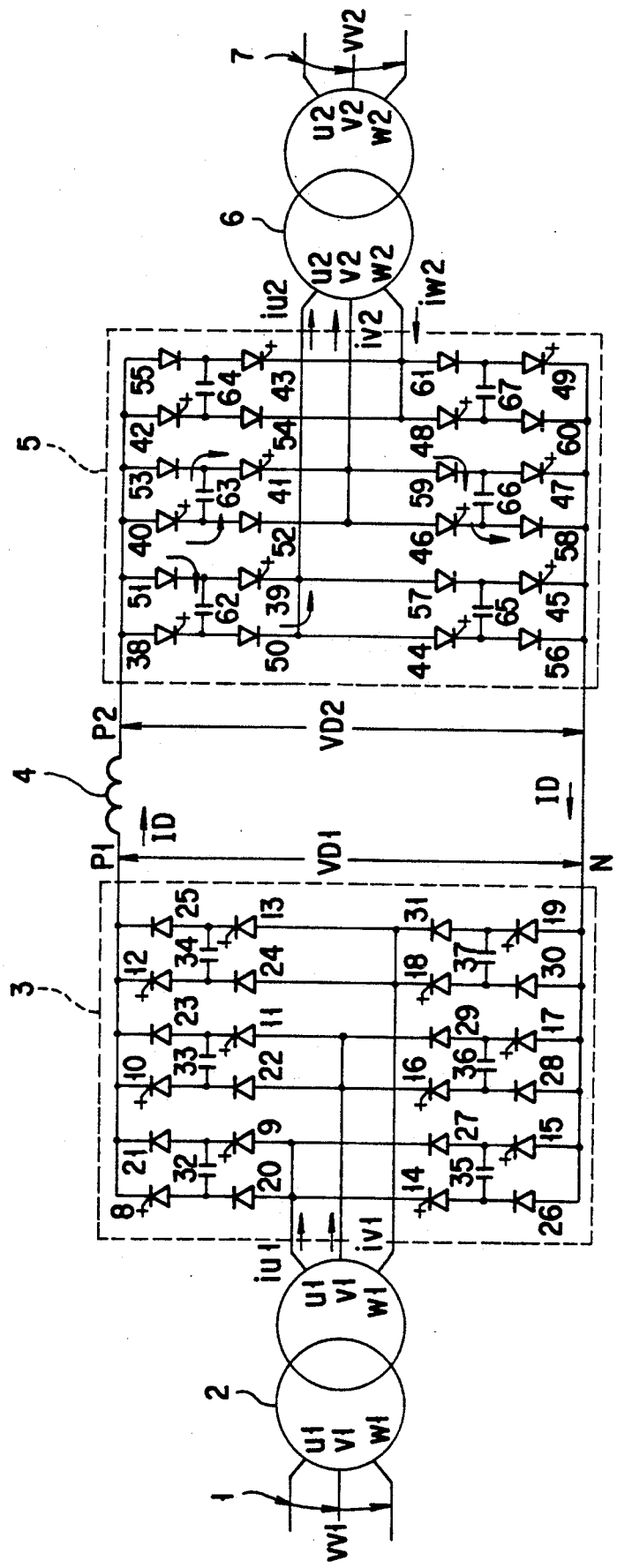
FIG. 1 is a circuit diagram, showing a power converting apparatus according to a first embodiment of the invention.
Figure 21:
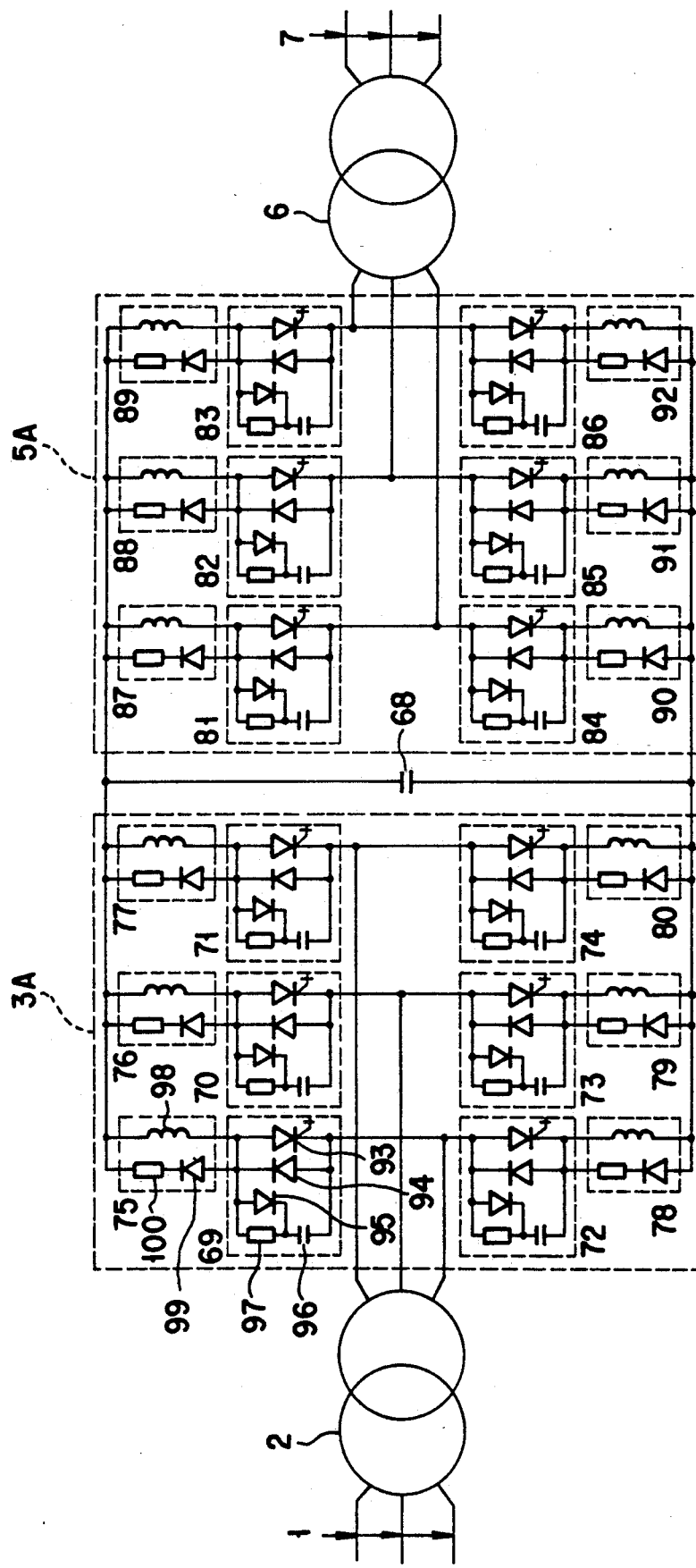
FIG. 21 shows a conventional power converting apparatus.

FIG. 1 shows a power converting apparatus according to a first embodiment of the invention. In FIG. 1, an element having the same function as an element in FIG. 21 is denoted by the same reference numeral as the latter. Reference numeral 1 denotes a first AC system, reference numeral 2 a first transformer, reference numeral 4 a DC reactor, reference numeral 6 a second transformer, and reference numeral 7 a second AC system.

The power converting apparatus of this embodiment has a first converter 3 and a second converter 5. Each of the converters has three pairs of positive-side switch units and negative-side switch units, each pair being connected to a corresponding phase terminal (U, V, W) of the AC system 1 by bridge connection.

In one switch unit of the first converter 3, a capacitor 32 is connected between first and second common junctions. The first common junction is provided between the cathode of a first self turn-off type semiconductor device, e.g. a GTO 9, and the anode of a first diode 21, and the second common junction is provided between the cathode of a second diode 20 and the anode of a second self turn-off type semiconductor device, e.g., a GTO 8. Further, a third common junction is provided between the anodes of the first GTO 9 and second diode 20, and a fourth common junction is provided between the cathodes of the first diode 21 and second GTO 8. The third and fourth common junctions serve as an AC-side terminal and a DC-side terminal, respectively.

Each of the other switch units forming the first converter 3 is constructed similar to the above switch unit.

Reference numerals 10-19 denote GTOs, reference numerals 22-31 diodes, and reference numerals 32-37 capacitors.

The second converter 5 has the same structure as the first converter 3. Reference numerals 38-49 denote GTOs, reference numerals 50-61 diodes, and reference numerals 62-67 capacitors. The GTOs are operated by a known gate control technique.

The operation of the apparatus constructed as above will be explained, referring, as an example, to the case of supplying the power of the first AC system 1 to the second AC system 7.

The AC power of the first AC system 1 is supplied to the first converter 3 via the first transformer 2, where the AC power is converted to a DC power. The DC reactor 4 smooth the output of the first converter 3. The second converter 5 converts the DC power to an AC power, and supplies the resultant AC power to the second AC system 7 via the second transformer 6.

Reference signs u1, v1, and w1 denote the secondary terminals of the first transformer 2, reference signs P1 and N the DC output terminals of the first converter 3, reference signs P2 and N the DC output terminals of the second converter 5, and reference signs u2, v2, and w2 the secondary terminals of the second transformer 6. Reference sign iu1 denotes a current flowing from the secondary phase terminal u1 of the first transformer 2 to the first converter 3. Reference sign iv1 denotes a current flowing from the secondary phase terminal v1 of the first transformer 2 to the first converter 3. Reference sign ID denotes the DC output current of the first converter 3.

Reference sign iu2 denotes a current flowing from the second converter 5 to the secondary phase terminal u2 of the second transformer 6. Reference sign iv2 denotes a current flowing from the second converter 5 to the secondary phase terminal v2 of the second transformer 6. Reference sign iw2 denotes a current flowing from the second converter 5 to the secondary phase terminal w2 of the second transformer 6.

Figure 2:
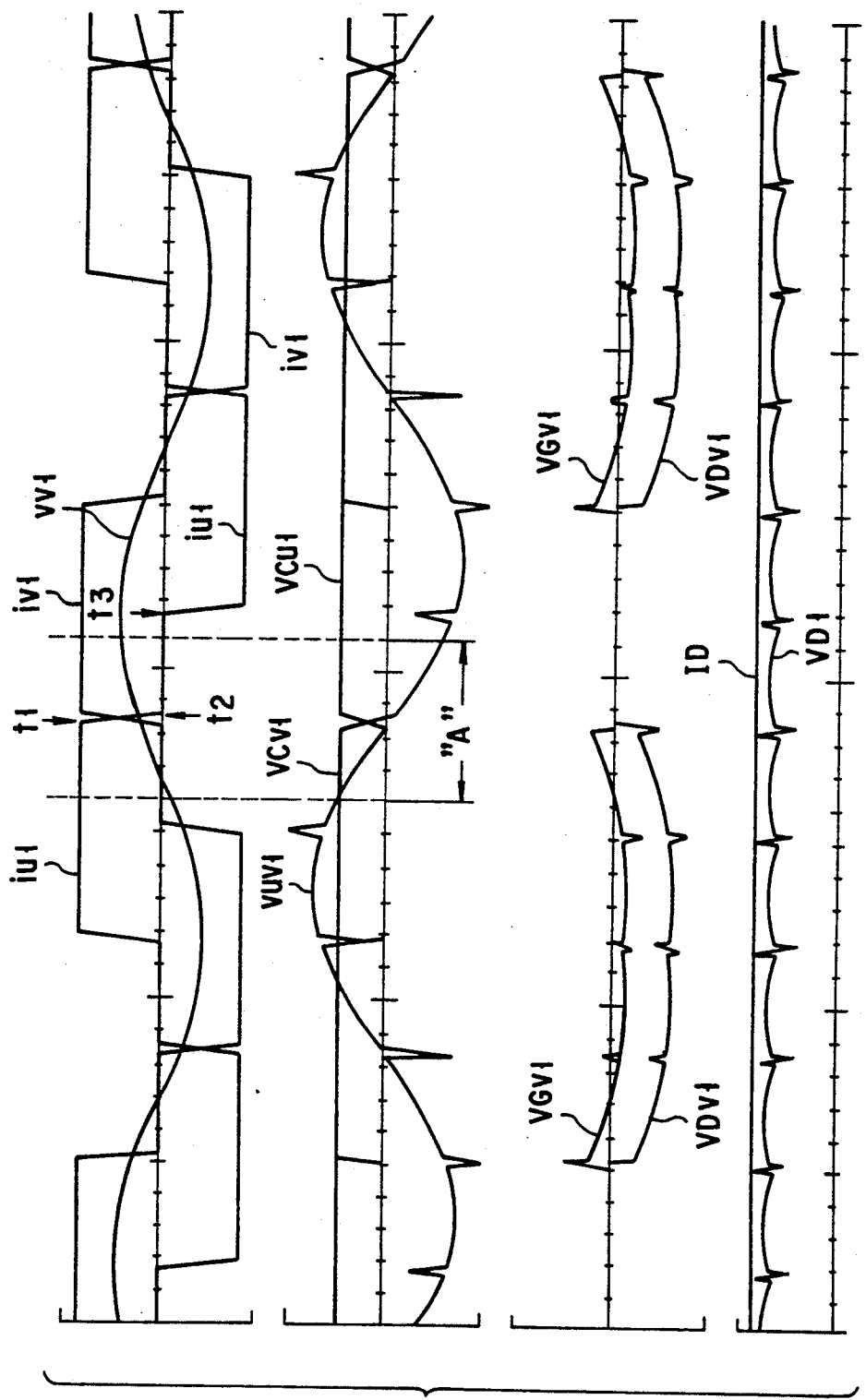
FIG. 2 is a waveform chart, useful in explaining AC/DC conversion performed in the embodiment of FIG. 1.

FIG. 2 is a waveform chart, useful in explaining the AC/DC conversion of the first converter 3. In FIG. 2, reference sign iu1 denotes a current flowing from the secondary phase terminal u1 of the first transformer 2 to the first converter 3. Reference sign iv1 denotes a current flowing from the secondary phase terminal v1 of the first transformer 2 to the first converter 3. Reference sign vv1 denotes a voltage at the primary phase terminal v1 of the first transformer 2. Reference sign vuv1 denotes a line-to-line voltage between the secondary phase terminals u1 and v1 of the first transformer 2.

Reference sign VCu1 denotes a voltage at the capacitor 32 of the first converter 3, reference sign VCv1 a voltage at the capacitor 33 of the converter 3, VGv1 a voltage at each of the GTOs 10 and 11 of the converter 3, VDv1 a voltage at each of the diodes 22 and 23 of the converter 3. Reference signs ID and VD1 denote the DC current of the first converter 3 and the DC voltage of the same, respectively.

Figure 3:
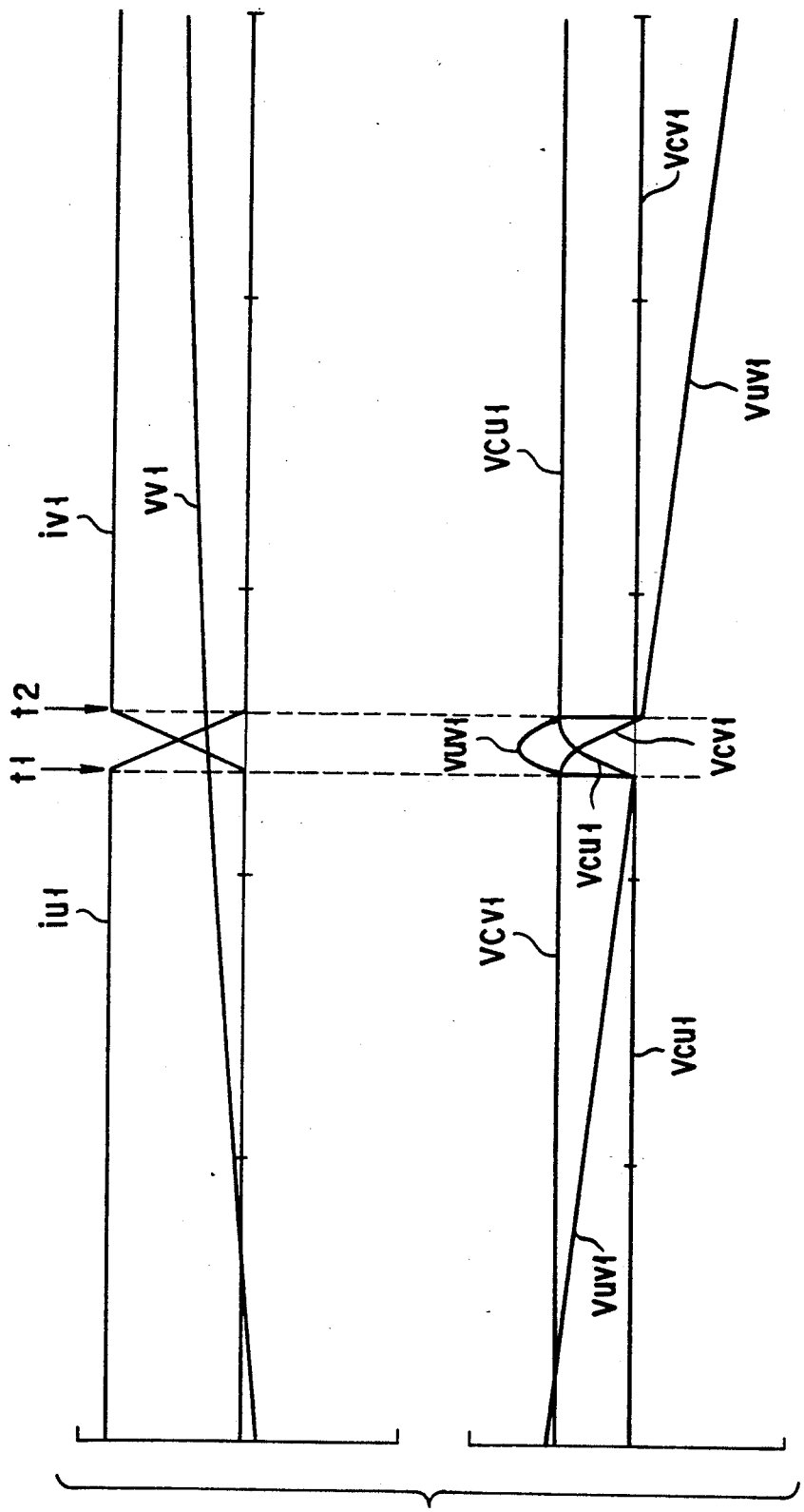
FIG. 3 is a waveform chart, useful in explaining commutation performed at the time of the AC/DC conversion in the embodiment of FIG. 1.

FIG. 3 is a waveform chart, useful in explaining commutation performed at the time of the AC/DC conversion in the embodiment of FIG. 1. Specifically, FIG. 3 is an enlarged waveform chart, showing a portion A in FIG. 2 in which commutation is performed from the u1 phase to the v1 phase between time points t1 and t2. Reference signs iu1, iv1, vv1, vuv1, VCu1, and VCv1 denote elements similar to those denoted by corresponding reference signs in FIG. 2.

FIGS. 4–7 are circuit diagrams, useful in explaining the commutation performed at the time of the AC/DC conversion in the embodiment. In these figures, reference numerals 8–19 designate GTOs, reference numerals 20–31 diodes, and reference numerals 32–37 capacitors, as in FIG. 1. The commutation performed in the embodiment at the time of the AC/DC conversion will now be explained with reference to FIGS. 4–7.

FIG. 4 shows the state of the circuit which exists before the time point t1. Specifically, the GTOs 8, 9, 18, and 19 and diodes 20, 21, 30, and 31 are in the on-state. The current from the phase terminal u1 is divided, and supplied to a series circuit consisting of the diode 20 and GTO 8 and to a series circuit consisting of the GTO 9 and diode 21, thereby flowing to the DC side.

The direct current ID is divided, and supplied to a series circuit consisting of the diode 30 and GTO 18 and to a series circuit consisting of the GTO 19 and diode 31, thereby flowing into the w1 phase. At this time, the currents iu1, ID, and iw1 have the same value.

FIG. 5 shows the state of the circuit which exists during positive-side commutation from the u1 phase to the v1 phase between the time points t1 and t2. At the time point t1, the GTOs 8 and 9 are turned off, and the GTOs 10 and 11 are turned on. Then, the voltage VCv1 at the capacitor 33 is applied so as to increase the current iv1 and decrease the current iu1. As a result, the current iv1 begins to flow and increases its current value, while the current iu1 decreases. The capacitor 32 is charged with the current iu1, and hence the voltage VCu1 at the capacitor 32 increases. Similarly, the voltage VCu1 is applied so a to increase the current iv1 and decrease the current iu1. The line-to-line voltage vuv between the v1 phase and u1 phase is the sum of the voltages VCv1 and VCu1. When the current iu1 and voltage VCv1 become 0 at the time point t2, the commutation is completed.

Figure 6:
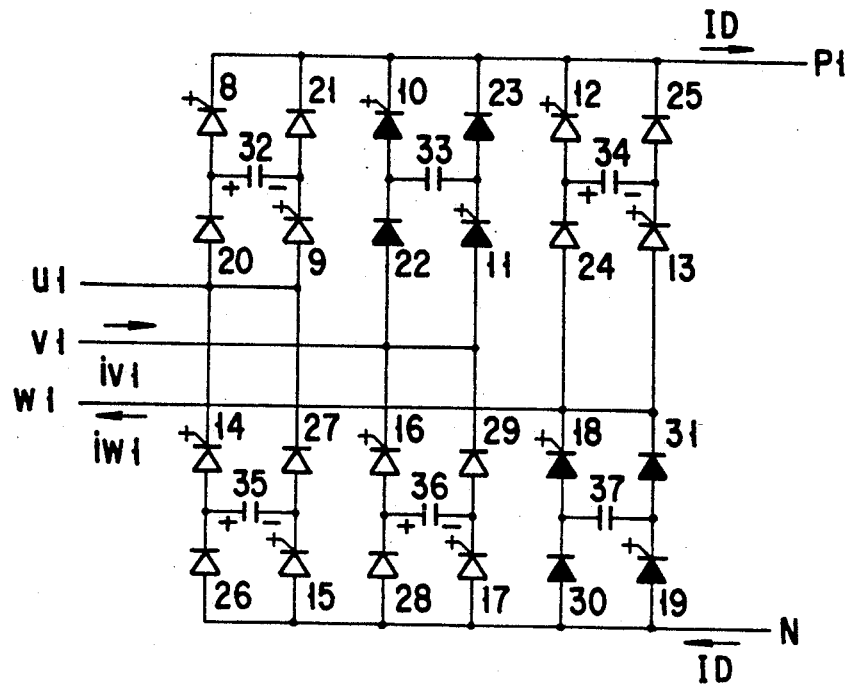
FIG. 6 is a circuit diagram, useful in explaining commutation performed at the time of the AC/DC conversion in the embodiment of FIG. 1.

FIG. 6 shows the state of the circuit which exists after the time point t2. When the VCv1 becomes 0 at the time point t2, the diodes 22 and 23 become conductive. Thus, the current iv1 is divided, and supplied to a series circuit consisting of the diode 22 and GTO 10 and to a series circuit consisting of the GTO 11 and diode 23, thereby flowing to the DC side. The direct current ID is divided, and supplied to a series circuit consisting of the diode 30 and GTO 18 and to a series circuit consisting of the GTO 19 and diode 31, thereby flowing into the w1 phase. At this time, the currents iv1, ID, and iw1 have the same value.

Figure 7:
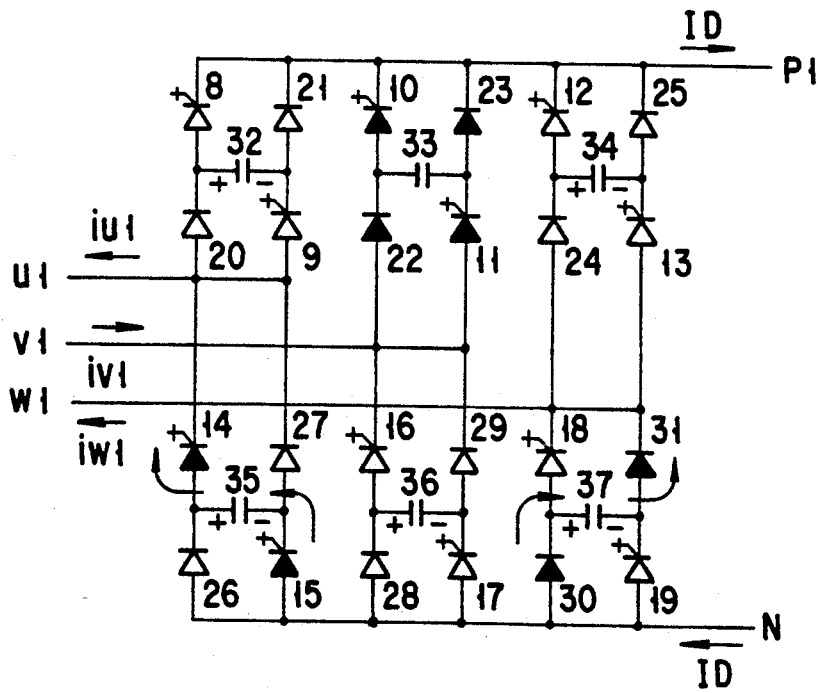
FIG. 7 is a circuit diagram, useful in explaining commutation performed at the time of the AC/DC conversion in the embodiment of FIG. 1.

FIG. 7 shows the state of the circuit which exists after a time point t3 during negative-side commutation from the w1 phase to the u1 phase. At the time point t3, the GTOs 18 and 19 are turned off, and the GTOs 14 and 15 are turned on. Then, the voltage at the capacitor 35 is applied so as to increase the current iu1 and decrease the current iw1, thereby starting commutation. Thereafter, the same operation as in the case of FIG. 5 is performed, thereby converting the AC power supplied from the secondary side of the first transformer 2, to a DC power by means of the first converter 3.

Figure 8:
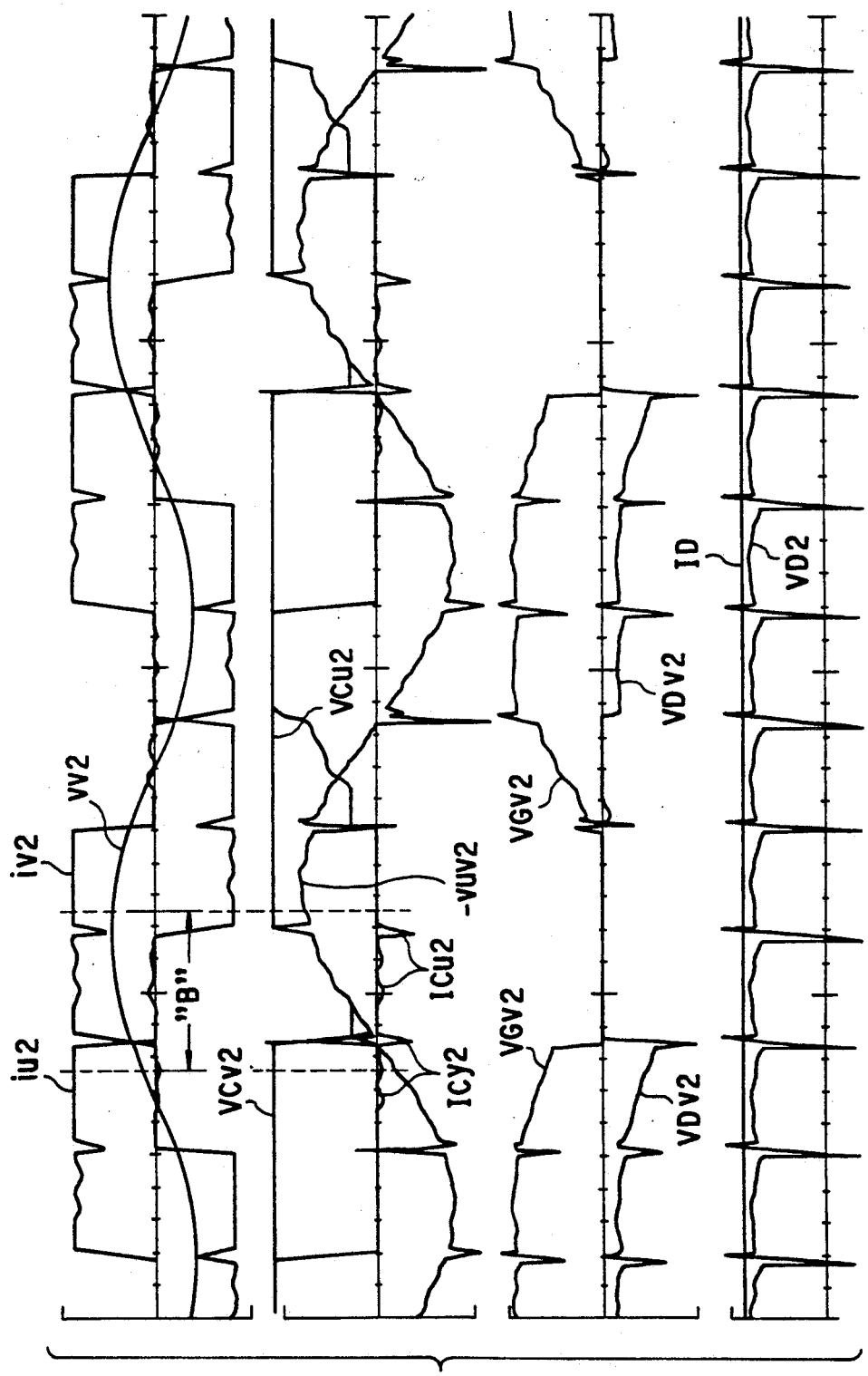
FIG. 8 is a waveform chart, useful in explaining DC/AC conversion performed in the embodiment of FIG. 1.

FIG. 8 is a waveform chart, showing DC/AC conversion of the second converter 5. In FIG. 8, reference sign iu2 denotes a current flowing from the second converter 5 to the secondary u2 phase of the second transformer 6, reference sign iv2 a current flowing from the second converter 5 to the secondary v2 phase of the second transformer 6, reference sign vv2 a voltage at the primary phase v2 of the second transformer 6, reference sign −vuv2 a line-to-line voltage between the secondary phases v2 and u2 of the second transformer 6, reference sign VCu2 a voltage at the capacitor 62 of the second converter 5, reference sign VCv2 a voltage at the capacitor 63 of the second converter 5, reference sign VGv2 a voltage at each of the GTOs 40 and 41 of the second converter 5, reference sign VDv2 a voltage at each of the diodes 52 and 53 of the second converter 5, reference sign ID a direct current flowing into the second converter 5, reference sign VD2 a DC input voltage supplied to the second converter 5, reference sign ICu2 a current flowing into the capacitor 62, and reference sign ICy2 a current flowing into the capacitor 66.

Figure 9:
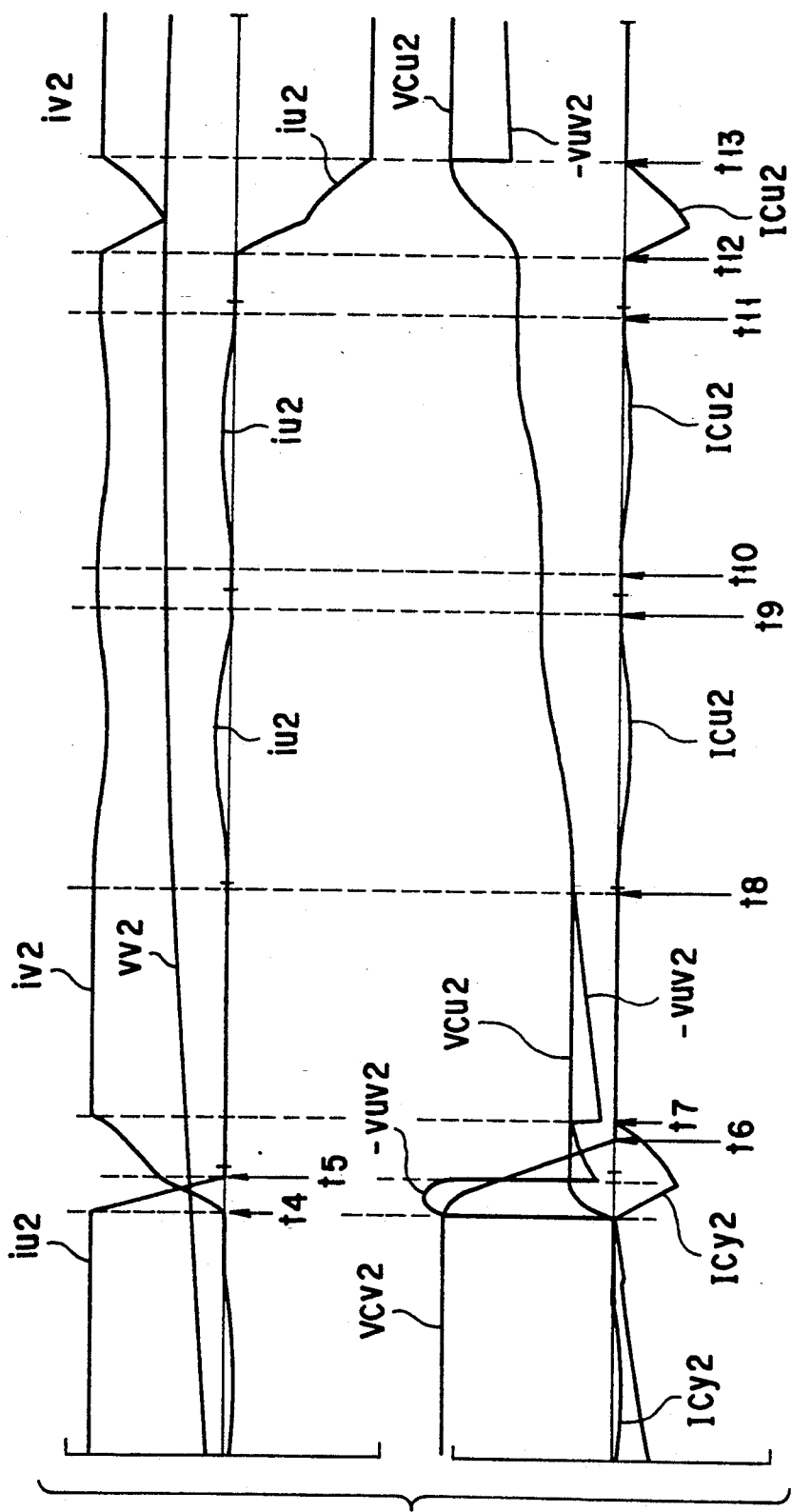
FIG. 9 is a waveform chart, useful in explaining commutation performed at the time of the DC/AC conversion in the embodiment of FIG. 1.

FIG. 9 is a waveform chart, showing commutation performed at the time of DC/AC conversion. Specifically, FIG. 9 is an enlarged waveform chart, showing a portion B in FIG. 8 in which commutation is performed from the u2 phase to the v2 phase. Reference signs iu2, iv2, vv2, −vuv2, VCu2, VCv2, ICu2, and ICy2 denote elements similar to those denoted by corresponding reference signs in FIG. 8.

Commutation performed in the embodiment of FIG. 1 at the time of DC/AC conversion will be explained with reference to FIGS. 1, 8, and 9.

Before a time point t4 at which commutation is performed from the u2 phase to the v2 phase, the GTOs 38, 39, 48, and 49 and diodes 50, 51, 60, and 61 are in the on-state, the current iu2 to the u2 phase is divided, and supplied to a series circuit consisting of the GTO 38 and diode 50 and to a series circuit consisting of the diode 51 and GTO 39. Further, the current iw2 from the phase terminal w2 is divided, and supplied to a series circuit consisting of the GTO 48 and diode 60 and to a series circuit consisting of the diode 61 and GTO 49. At this time, the currents iu2, iw2, and ID have the same value.

At a time point t4, the GTOs 38 and 39 are turned off, and the GTOs 40 and 41 are turned on. The voltage VCv2 at the capacitor 63 is applied so as to increase the current iv2 and decrease the current iu2. As a result, the current iv2 begins to flow and increases its current value, while the current iu2 decreases. The capacitor 62 is charged with the current iu2, thereby increasing the voltage VCu2 thereof. Like the voltage VCv2, the voltage VCu2 is applied so as to increase the current iv2 and decrease the current iu2. The line voltage −vuv2 between the phase terminals v2 and u2 is the sum of the voltages VCv2 and VCu2.

At a time point t5, the current iu2 becomes 0. The capacitor 63 is continuously discharged by the current iv2. When the voltage VCv2 becomes 0 at a time point t6, the diodes 52 and 53 become conductive, thereby completing the commutation. During a time period from the time point t4 to the time point t5, a commutation voltage indicated by the reference sign −vuv2 is applied between the v2 phase and u2, thereby increasing a voltage between the v2 phase and w2, to a value higher than the voltage at the capacitor 66.

As a result, the diodes 59 and 58 are forwardly biased, and a current denoted by the reference sign ICy2 flows to the capacitor 66. When the current iu2 becomes 0 and diodes 50 and 51 are turned off at the time point t5, the voltage −vuv2 and the voltage between the v2 phase and w2 decrease, with the result that the current ICy2 decreases and becomes 0 at a time point t7.

The value of the current iv2 is reduced in accordance with the flow of the current ICy2. When the voltage −vuv2 becomes higher than the voltage VCu2 at a time point t8, the diodes 51 and 50 become conductive, thereby flowing the current ICu2 and charging the capacitor 62.

The current ICu2 becomes 0 at a time point t9, and again flows during a period between time points t10 and t11. Thereafter, when the GTOs 48 and 49 turned off and GTOs 44 and 45 turned on at a time point t12, the voltage at the capacitor 65 is applied so as to increase the current iu2 and decrease the current iw2, thus performing negative-side commutation from the w2 phase to the u2 phase. At this time, the current ICu2 flows to the capacitor 62 during a period between time points t12 and t13, as during the period between the time points t4 and t7. Thus, DC/AC conversion is performed, i.e., the DC power supplied to the second converter 5 is converted to an AC power, and is then supplied to the second AC system 7 via the second transformer 6.

The above-described embodiment provides the following advantages:

(1) The charge accumulated in the capacitor at the time of a phase current on the AC side being made 0 during commutation will be discharged to the AC side on the next occasion to flow the same phase current as above, which causes no dissipation and enhances the efficiency of the apparatus.

(2) When the u1-phase GTOs 8 and 9 are turned off, the rat dv/dt of the increase of the forward voltage of each of the GTOs will be minimized, since the capacitor 32 is connected to the GTOs in parallel therewith by means of the conducting diodes 21 and 20, as is shown in FIG. 5. Accordingly, no particular snubber circuits are needed, resulting in a simple arm structure. Further, the aforementioned disadvantages of the conventional device can be removed.

Though in the first embodiment, the invention is applied to a current-type converter, it is also applicable to a voltage-type converter. In the case of application to a current-type converter, it is advantageous that the converter is prevented from greatly affecting AC-side power source failure.

Then, a power converting apparatus according to a second embodiment of the invention will be explained.

Figure 10:
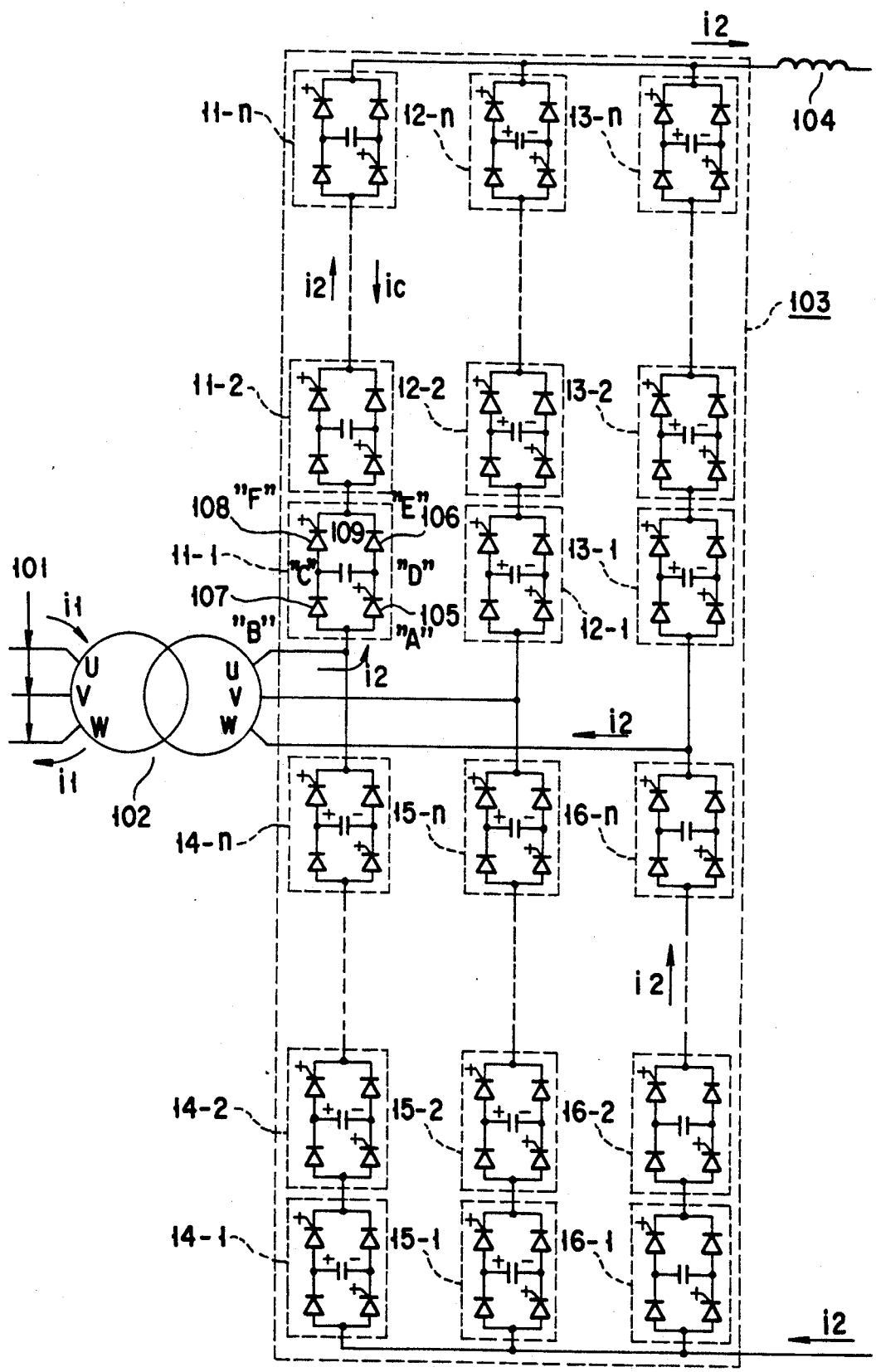
FIG. 10 is a circuit diagram, showing a power converting apparatus according to a second embodiment of the invention.

FIG. 10 shows the structure of the second embodiment. In this figure, reference numeral 101 denotes an AC power source, reference numeral 102 a transformer, reference numeral 103 a converter, and reference numeral 104 a DC reactor.

The converter 103 has a positive-side arm and a negative-side arm. The positive-side arm has U-phase switch units 11-1-11-n, V-phase switch units 12-1-12-n, and W-phase switch units 13-1-13-n, which correspond to each phase terminal of the AC power source 101. The negative-side arm has X-phase switch units 14-1-14-n, Y-phase switch units 15-1-15-n, and Z-phase switch units 16-1-16-n, which correspond to each phase terminal of the AC power source 101.

Each of the U-phase switch units 11-1-11-n comprises a series circuit consisting of a first self turn-off type semiconductor device, such as a GTO 105, and a first diode 106, a series circuit consisting of a second diode 107 and a second self turn-off type semiconductor device, such as a GTO 108, and a capacitor 109.

The U-phase switch units 11-1-11-n are connected in series. A third common junction is formed between the anode of the GTO 105 and the anode of the second diode 107, and a fourth common junction is formed between the cathode of the first diode 106 and the cathode of the GTO 108. The third common junction of one of each adjacent pair of the switch units is connected to the fourth common junction of the other. The third common junction of the switch unit 11-1 serves as an AC-side terminal, and the fourth common junction of the switch unit 11-n serves as a DC-side terminal. The other switch units of the positive-side arm have the same structure as the above.

The negative-side X-phase switch units 14-1-14-n have the same structure as the positive-side switch units. The third common junction of the X-phase switch unit 14-1 serves as a DC-side terminal, and the fourth common junction of the switch unit 14-n serves as an AC-side terminal. The other switch units of the positive-side arm have the same structure as above.

The operation of the second embodiment constructed as above will be explained.

Suppose that a current i2 flows through a closed loop formed by the secondary u-phase terminal of the transformer 102, U-phase switch units 11-1-11-n, DC reactor 104, a load (not shown), Z-phase switch units 16-1-16n, and the secondary w-phase terminal of the transformer 102. Reference sign il denotes a current corresponding to the current i2 and flowing on the primary side of the transformer 102.

When positive-side commutation is started by turning off all the GTOs 105 and 108 of the U-phase switch units 11-1-11-n and turning on all the GTOs 105' and 108' of the V-phase switch units 12-1-12-n (dash "'" is attached to the GTOs of the V-phase switch units so as to discriminate them from those of the U-phase switch units), the current i2 flows through the diodes 107 and 106 and capacitor 109 in each of the U-phase switch units 11-1-11-n. In the V-phase switch units 12-1—12-n, a voltage at the capacitor 109' is forwardly applied to the GTOs 105' and 108' when all the GTOs 105' and 108' are turned on, thereby increasing a commutation current ic in the direction indicated by the arrow.

Further, suppose that a half current i2/2 of the current i2 is flowing through the GTOs 105 and 108 of the U-phase switch units 11-1-11-n, respectively, immediately before they are turned off. In this case, by turning off the GTOs 105 and 108, a current change of i2/2 will occur in a closed circuit "A", "B", "C", "D", and "A", and at the same time, a current change of i2/2 will occur in a closed circuit "C", "D", "E", "F", and "C". As a result, a change in magnetic flux proportional to the product of i2/2 and an area defined by the points "A", "B", "C", and "D" occurs in the closed circuit "A", "B", "C", "D", and "A".

At the same time, a change in magnetic flux proportional to the product of i2/2 and an area defined by the points "C", "D", "E", and "F" occurs in the closed circuit "C", "D", "E", "F", and "C". The amount of a change in electromagnetic energy is consumed as a switching loss when the GTOs 105 and 108 are turned off. The same can be said of the other switch units.

In the embodiment, a closed loop in which a current change will occur at the time of interrupting the current flowing through a GTO is formed in each switch unit of the bridge arm constituting the converter.

Specifically, in the conventional structure, a current change may occur over two or more arm phases as a result of interruption of current flow through a GTO. Thus, the distance between adjacent arms must be made wider to electrically isolate them, in order to increase the number of GTO switches arranged in series thereby to increase the voltage applied thereto. And, if the distance is increased, leakage inductance is accordingly increased, resulting in an increase in switching loss. This being so, increase of the voltage applied to the apparatus is limited.

On the other hand, in the embodiment of the invention, a current change as a result of interruption of current flow through a GTO complete only in a switch unit having the GTO. Accordingly, if the number of switch units connected in series is n, the voltage applied to each switch unit is 1/n of the overall voltage, and hence the space for electrically isolating the switch units can be made narrow, which can reduce leakage inductance.

Further, although the number of switch units connected in series is increased, leakage inductance caused in a current loop by interruption of one GTO does not change, which enables a power converting apparatus of high voltage and high capacity to be produced.

Then, a modification of the arm employed in the second embodiment will be explained with reference to FIG. 11. In this figure, only one arm of the bridge of a converter is shown.

The arm comprises a plurality of switch units 17-1–17-n connected in series. Each of the switch units has a half unit consisting of a GTO 181, diodes 182 and 183, a GTO 184, a capacitor 185, which are connected as in a switch unit in the second embodiment, and the other half unit consisting of a GTO 181', diodes 182' and 183', a GTO 184', a capacitor 185', which are connected similar to the above. The cathode of the diode 182 is connected to the anode of the diode 183', and the cathode of the GTO 184 is connected to the anode of the GTO 181'.

Figure 11:
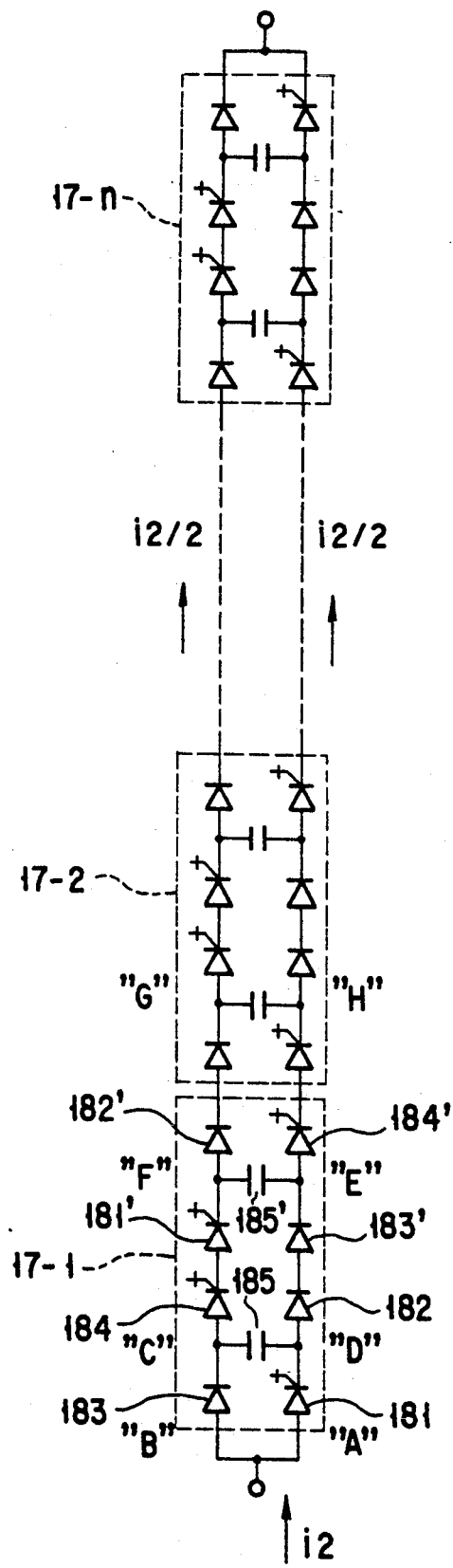
FIG. 11 is a circuit diagram, showing a modification of an arm portion employed in the apparatus of FIG. 10.

In the switch units 17-1–17-n constructed as above, the arm current i2 is divided into two currents i2/2 flowing through right and left elements, respectively, as is shown in FIG. 11.

Suppose that the currents i2/2 are flowing through the GTOs 181, 184, 181', and 184' of the switch unit 17-1, respectively, immediately before they are turned off. In this case, turning off the GTOs will cause a current change of i2/2 in a closed circuit "A", "B", "C", "D", and "A", also in a closed circuit "C", "D", "E", "F", and "C", and in a close circuit "E", "F", "G", "H", and "E".

As a result, a change in magnetic flux proportional to the product of i2/2 and an area defined by the points "A", "B", "C", and "D" occurs in the closed circuit "A", "B", "C", "D", and "A".

At the same time, a change in magnetic flux proportional to the product of i2/2 and an area defined by the points "C", "D", "E", and "F" occurs in the closed circuit "C", "D", "E", "F", and "C".

Similarly, a change in magnetic flux proportional to the product of i2/2 and an area defined by the points "E", "F", "G", and "H" occurs in the closed circuit "E", "F", "G", "H" and "E".

The amount of a change in electromagnetic energy is consumed as a switching loss when the GTOs 181, 184, 181' and 184' are turned off. The same can be said of the other switch units 17-2–17-n.

Using the above modification as the arm in the second embodiment can provide an advantage similar to that obtained therein. Further, since the elements arranged on the left side and those arranged on the right side are connected in series, respectively, the sum of forward-directional voltage drops in the left-side elements can be accurately made equal to that of forward-directional voltage drops in the right-side elements, thereby accurately balancing the current flowing through the left-side elements with that flowing through the right-side elements.

Although in the second embodiment and its modification, explanation has been made to a power converting apparatus provided with arm connected by bridge connection and each having a plurality of switch units connected in series, these arms may be applied to another type of power converting apparatus or switch device.

In addition, though the self turn-off type semiconductor device employed in the power converting apparatus comprises a GTO, the invention is not limited to GTOs, but another type of self turn-off type semiconductor device can provide an advantage similar to that obtained by the GTO.

Modifications of the switch units employed in the first and second embodiments will now be explained with reference to FIGS. 12–15. These modifications can be replaced with the switch units in the embodiments.

Figure 12:
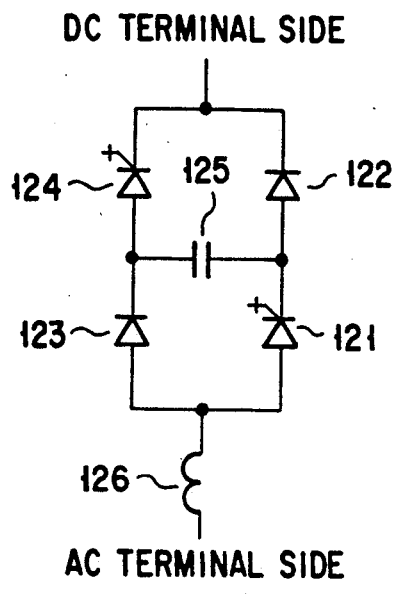
FIG. 12 is a circuit diagram, showing a first modification of a switch unit employed in the apparatus of FIG. 1.
Figure 13:
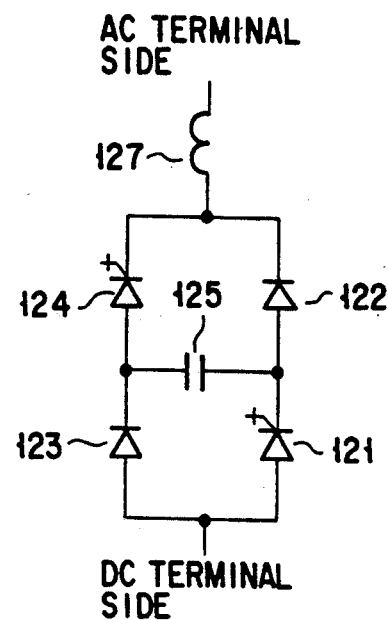
FIG. 13 is a circuit diagram, showing a second modification of the switch unit employed in the apparatus of FIG. 1.

The modification shown in FIGS. 12 and 13 has a reverse-blocking type GTO used as the self turn-off type semiconductor device, and a reactor provided between a switch unit and an AC power source. More specifically, FIG. 12 shows a switch unit constituting a positive-side arm, while FIG. 13 shows a switch unit constituting a negative-side arm.

Each of the positive- and negative-side switch units comprises a first reverse-blocking type GTO 121, first and second diodes 122 and 123, a second reverse-blocking type GTO 124, a capacitor 125, which are connected as in each switch unit employed in the first and second embodiments. In the positive-side switch unit, a reactor 126 is connected in series between the AC power source and the junction of the anodes of the first reverse-blocking type GTO 121 and second diode 123. In the negative-side switch unit, a reactor 127 is connected in series between the DC power source and the junction of the cathodes of the second reverse-blocking type GTO 124 and first diode 122.

Since the reactor separates the positive- and negative-side arms (switch units) from each other, if the above-described switch units are applied to the power converting apparatus of the first or second embodiment, a commutation voltage at the positive-side arm is prevented from adversely affecting the negative-side arm, and at the same time a commutation voltage at the negative-side arm is prevented from adversely affecting the positive-side arm, thereby avoiding interference between the positive and negative-side arms at the time of commutation, resulting in a reduction in a voltage applied to the reverse-blocking type GTO in each switch unit.

In the conventional power converting apparatus, a commutation voltage at the positive-side arm affects the negative-side arm, and that at the negative-side arm affects the positive-side arm, so that the voltage applied to the reverse-blocking type GTO increases by the commutation voltage value. To avoid this, it is necessary to drop the voltage at the GTO by the commutation voltage value.

In the power converting apparatus having switch units according to the modification, a commutation voltage applied to the reverse-blocking type GTO is reduced, which enables a high voltage to be applied in the circuit. This is economically advantageous.

A result similar to the above can be obtained by reversing the positions of the switch unit and reactor. In this case, a switch unit connected to a reactor as shown in FIG. 13 is used as the positive-side switch unit, and a switch unit connected to a reactor as shown in FIG. 12 is used as the negative-side switch unit.

Figure 14:
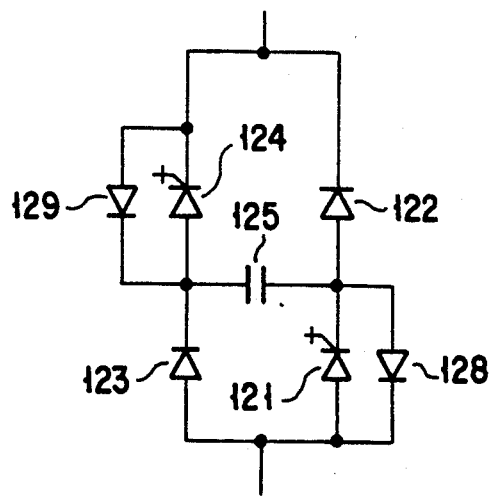
FIG. 14 is a circuit diagram, showing a third modification of the switch unit employed in the apparatus of FIG. 1.

The modification shown in FIG. 14 has diodes 128 and 129 connected in parallel with the first and second reverse-blocking type GTOs and in directions opposite thereto, respectively.

Explanations will be made to the case of using switch units constructed a above in the power converting apparatus of the first embodiment.

For example, at the time of commutation from the U-phase switch unit of the first or second converter 3 or 5 to the V-phase switch unit, when the reverse-blocking type GTOs 121 and 124 of the U-phase switch unit are turned off, and the reverse-blocking type GTOs 121' and 124' of the V-phase switch unit (dash "'" is attached to the GTOs of the V-phase switch units so as to discriminate them from those of the U-phase switch units) are turned on, the reverse-blocking type GTOs 121 and 124 are forwardly biased by the line-to-line voltage between the U- and V-phase, and become conductive.

As a result, a closed loop is formed, which comprises the V-phase capacitor 125', reverse-blocking type GTO 124', V-phase terminal of the AC system, U-phase terminal of the AC system, diode 129, U-phase capacitor 125, diode 128, reverse-blocking type GTO 121', and V-phase capacitor 125', which are connected in the order mentioned. Thus, the charge of the V-phase capacitor 125' is discharged, and forming the closed loop charging the U-phase capacitor 125, so that discharge of the V-phase capacitor 125' and charge of the U-phase capacitor 125 will not drag on even when the direct current is so small.

In the modification of FIG. 14, charge time of the capacitor of the switch unit will not drag on even when the apparatus is operated by a small current, which makes the apparatus free from a change in direct current due to operation current. As a result, a stable operation can be performed over a wide range of from a rated current to a small current.

Figure 15:
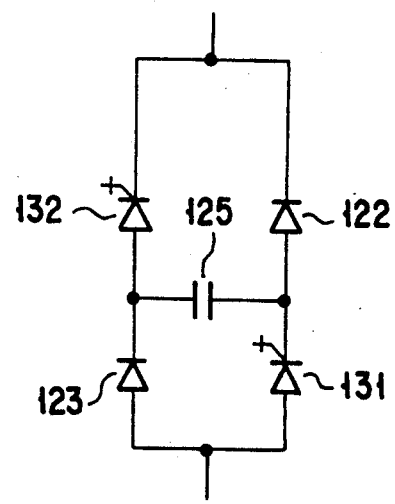
FIG. 15 is a circuit diagram, showing a fourth modification of the switch unit employed in the apparatus of FIG. 1.

The modification shown in FIG. 15 is a switch unit which employs reverse-conducting type GTOs 131 and 132 used as the first and second self turn off type semiconductor devices These reverse-conducting type GTOs 131 and 132 have a function identical to that of the circuit consisting of the reverse-blocking type GTO and diode (FIG. 14) connected in parallel in opposite directions. Therefore, explanation of the GTOs 131 and 132 will be omitted.

Applying the switch unit shown in FIG. 15 to the power converting apparatus of the first or second embodiment will provide an advantage similar to that obtained by the modification shown in FIG. 14.

The modification shown in FIG. 12 or FIG. 13 may be combined with that shown in FIG. 15 such that the switch unit consisting of a reverse-conducting type GTO is connected to a reactor in series, or such that the switch unit consisting of a GTO and a diode connected in parallel in opposite directions is connected to a reactor in series. These switch units can be used in the first and second embodiments.

Figure 16:
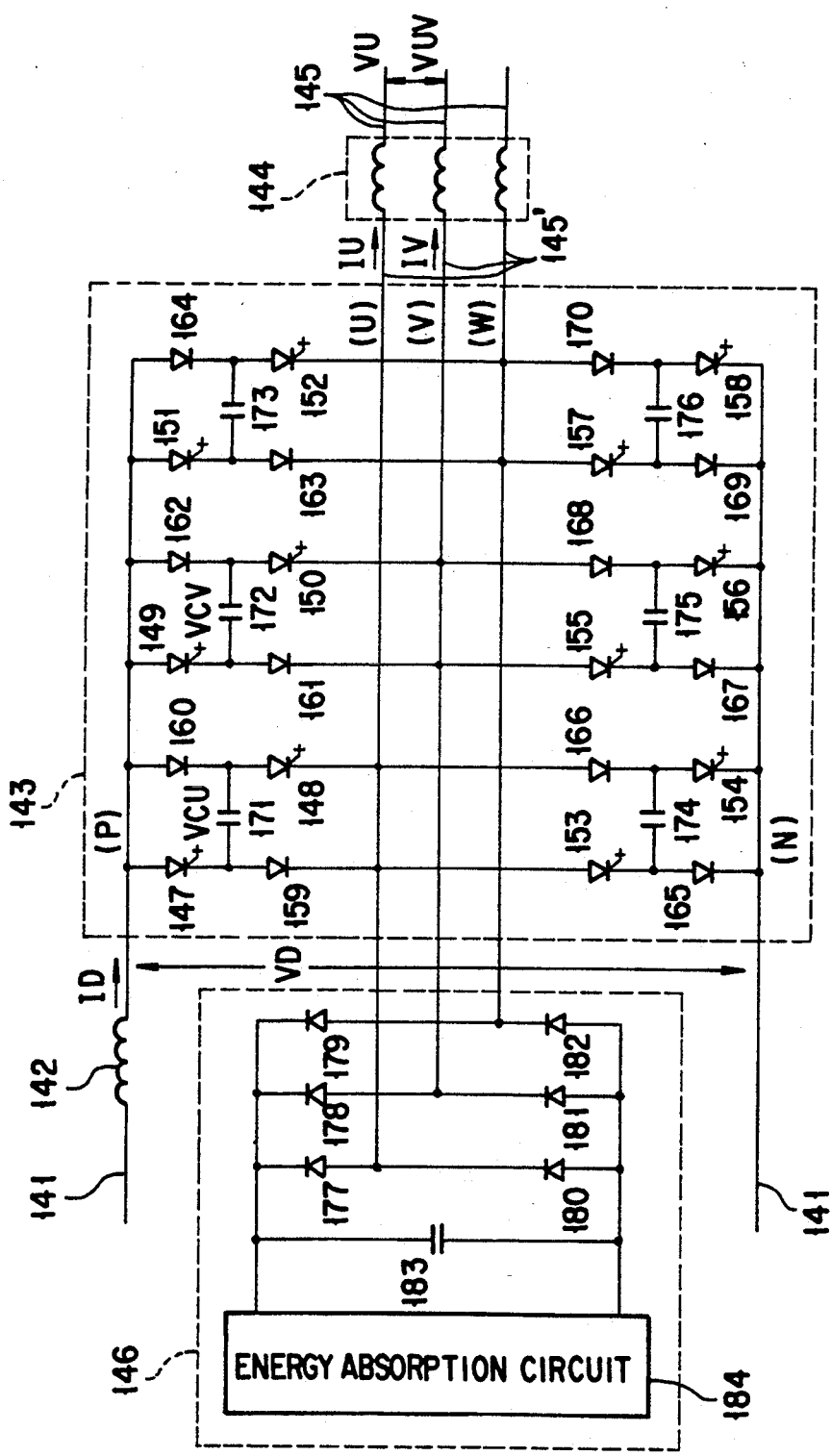
FIG. 16 is a circuit diagram, showing a power converting apparatus according to a third embodiment of the invention.

FIG. 16 shows a power converting apparatus according to a third embodiment of the invention. In FIG. 16, reference numeral 141 denotes a DC power source, reference numeral 142 a DC reactor, reference numeral 143 a converter, reference numeral 144 an AC reactor, reference numeral 145 an AC power source, and reference numeral 146 a voltage restraint circuit. Further, reference numerals 147-158 denote reverse-conducting type GTOs, reference numerals 159-170 diodes, and reference numerals 171-176 capacitors.

A converter 143 is provided between the both opposite terminals of the DC power source 141, and connected to each phase terminal of the AC power source 145 via the AC reactor 144.

The converter 143 comprises U- through Z-phase switch units each having a structure similar to that of the switch unit shown in FIG. 15. Specifically, the U-phase switch unit consists of reverse-conducting type GTOs 147 and 148, diodes 159 and 160, and a capacitor 171. The V-phase switch unit consists of GTOs 149 and 150, diodes 161 and 162, and a capacitor 172. The W-phase switch unit consists of GTOs 151 and 152, diodes 163 and 164, and a capacitor 173. The X-phase switch unit consists of GTOs 153 and 154, diodes 165 and 166, and a capacitor 174. The Y-phase switch unit consists of GTOs 155 and 156, diodes 167 and 168, and a capacitor 175. The Z-phase switch unit consists of GTOs 157 and 158, diodes 169 and 170, and a capacitor 176.

The voltage restraint circuit 146 consists of diodes 177-182, a capacitor 183, and an energy absorption circuit 148.

Figure 17:
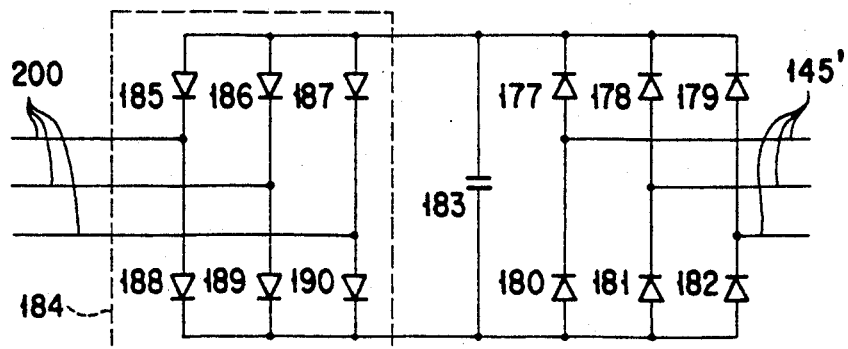
FIG. 17 shows a voltage suppressing circuit.

FIG. 17 shows the voltage restraint circuit 146 in detail.

A forward-directional series circuit consisting of the diodes 177 and 180, a forward-directional series circuit consisting of the diodes 178 and 181, a forward-directional series circuit consisting of the diodes 179 and 182, and a capacitor 183 are connected in parallel with one another between the both opposite terminals of the energy absorption circuit 184.

Each junction between the cathode of one (180-182) of the diodes of a corresponding series circuit and the anode of the other (177-179) of the diodes of the same is connected to an AC terminal 145' of the converter 143 to corresponding each phase.

The energy absorption circuit 184 has six thyristors 185-190. A series circuit consisting of the thyrister 185 and 188 having its anode connected to the cathode of the thyrister 185, a series circuit consisting of the thyrister 186 and 189 having its anode connected to the cathode of the thyrister 186, and a series circuit consisting of the thyrister 187 and 190 having its anode connected to the cathode of the thyrister 187 are connected in parallel with one another. An AC power source 200 for regenerating the absorbed energy is connected to each junction between the thyrister and diode of a corresponding series circuit.

In the power converting apparatus constructed as above, at the time of commutation from the U phase to the V-phase, the sum of a line-to-line voltage between the U- and V-phase of the AC terminals 145' of the convertor 143 and a voltage at the V-phase capacitor 172 is applied to the reverse-conducting GTOs 147 and 148 in a reverse direction, thereby causing the GTOs 147 and 148 to be conductive in the reverse direction, and charging the capacitor 171.

Accordingly, the voltage at the capacitor 171 is increased. When it exceeds the voltage at the capacitor 183, the diodes 177 and 181 become conductive, thereby causing the current flowing to the capacitor 171 via the reverse-conducting GTOs 148 and 147, to flow also to the capacitor 183.

If the electrostatic capacity of the capacitor 183 is larger than that of the capacitor 171, the current flowing to the capacitor 171 via the reverse-conducting GTOs 148 and 147 becomes substantially 0, thus restraining the increase of the voltage at the capacitor 171.

Similarly, in commutation from the Z-phase to the X-phase, increase of the voltage at the capacitor 176 is restrained. In commutation from the V-phase to the W-phase, increase of the voltage at the capacitor 172 is restrained. In commutation from the Y-phase to the Z-phase, increase of the voltage at the capacitor 175 is restrained.

The electricity having flown to the capacitor 183 of the voltage restraint circuit 146 is regenerated to the AC power source 200 via the energy absorption circuit 184 constituting a DC/AC converting circuit.

In the above-described third embodiment, increase of the voltage at each of the capacitors 171-176 can be restrained, so that operation can be performed in a region in which a leading current flows in the direction of the AC power source 145.

The following was found from comparison of the converting apparatus of the invention with a converting apparatus equipped with no voltage restraint circuits: The maximum value of the voltage at the capacitor 171 in the converting apparatus of the invention is 52% of that of the voltage at a corresponding capacitor in the other converting apparatus. The maximum value of the voltage at the GTOs 147 and 148 in the converting apparatus of the invention is 59% of that of the voltage at corresponding elements in the other converting apparatus. The maximum value of the voltage at the diodes 159 and 160 capacitor 171 in the converting apparatus of the invention is 52% of that of the voltage at corresponding elements in the other converting apparatus. Further, the average value of the current flowing to the capacitor 183 is 1.4% of the direct current ID. As is evident from the above, the voltage applied to the converter employed in the invention can be considerably reduced, which is economically advantageous.

Figure 18:
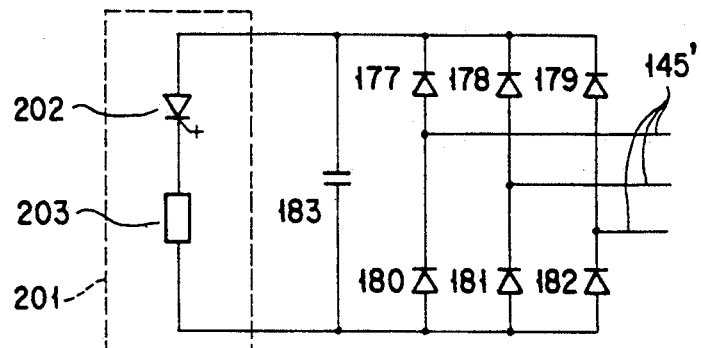
FIG. 18 shows a first modification of the voltage suppressing circuit.
Figure 19:
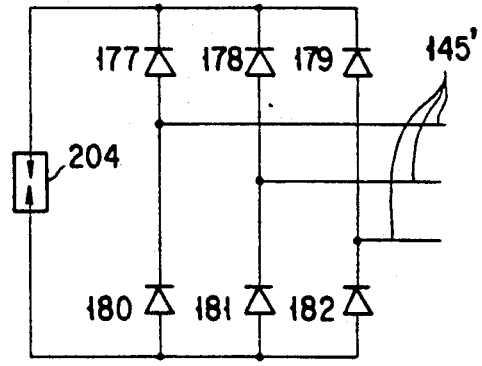
FIG. 19 shows a second modification of the voltage suppressing circuit.
Figure 20:
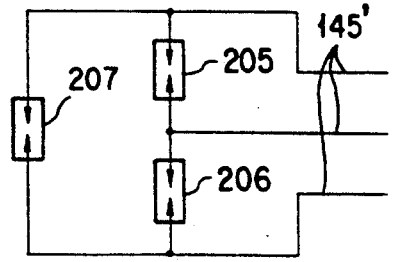
FIG. 20 shows a third modification of the voltage suppressing circuit.

FIGS. 18-20 show modifications of the voltage restraint circuit employed in the third embodiment. In these figures, an element having the same function as an element in the third embodiment is denoted by the same reference numeral as the latter.

The modification of FIG. 18 has an energy absorption circuit 201 formed by a series circuit consisting of a GTO 202 and a resistor 203. The on/off of the GTO 202 is controlled so as to keep the voltage at the capacitor 183 under a predetermined value. The resistor 203 restrains increase of the voltage at the capacitor 183 by consuming the electricity accumulated in the same.

The modification of FIG. 19 has an energy absorption circuit formed by a non-linear resistor element 204. The resistor element 204 has the characteristic that its resistance value abruptly drops when a voltage higher than a predetermined value is applied thereto.

In this modification, the resistance value of the non-linear resistor element will abruptly drop when the voltage at the AC power source 145 exceeds a predetermined value, thereby restraining increase of the voltage.

In the modification of FIG. 20, three non-linear resistor elements 205-207 are connected so as to form a closed loop, and the AC power source 145 is connected to the junction between the non-linear resistor elements 205 and 206, and to the opposite terminals of the non-linear resistor elements 205 and 206.

In this modification, when the voltage at the AC power source 145 of the converter 143 exceeds a predetermined value, the resistances of the resistor elements 205-207 suddenly drop, thereby restraining increase of the voltage.

In addition, the switch units employed in the power converting apparatuses with the restraint circuits shown in FIGS. 17-20 can be replaced with those shown in FIGS. 10-14.

The invention is applicable not only to a current-type power converting apparatus, but also to a voltage-type one.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claim and their equivalents.

What is claimed is:

1. A power converting apparatus for controlling switching of self turn-off type semiconductor devices each having a cathode, an anode, and a gate, comprising:

conversion means having a plurality of switch units and performing power conversion, the switch units each having first and second self turn-off type semiconductor devices, first and second diodes, and a capacitor, the cathode of the first self turn-off type semiconductor device being connected to the anode of the first diode, the cathode of the second diode being connected to the anode of the second self turn-off type semiconductor device, a first junction including a common junction between the cathode of the first self turnoff type semiconductor device and the anode of the first diode, a second junction including a common junction between the cathode of the second diode and the anode of the second self turn-off type semiconductor device, one electrode of the capacitor being connected to the first junction, the other electrode of the capacitor being connected to the second junction.

2. The power converting apparatus according to claim 1, wherein the conversion means has arm means having the switch units connected in series, and having a first end portion and a second end portion, each of the switch units having a third junction including a common junction between the anode of the first self turn-off type semiconductor device and the anode of the second diode, and a fourth junction including a common junction between the cathode of the second self turn off type semiconductor device and the cathode of the first diode, the third junction of one of each adjacent two of the switch units being connected to the fourth junction of the other of the adjacent two of the switch units.

3. The power converting apparatus according to claim 1, wherein the conversion means has arm means having the switch units connected in series, and having a first end portion and a second end portion, one of the switch units which is located at the first end portion of the arm means has a third junction including a common junction between the anodes of the first self turn-off type semiconductor device and of the second diode, one of the switch units which is located at the second end portion of the arm means has a fourth junction including a common junction between the cathodes of the second self turn-off type semiconductor device and of the first diode, and in each adjacent pair of the switch units between the first and second end portions of the arm means, the cathode of the first diode of one of the adjacent pair of the switch units is connected to the anode of the second diode of the other of the adjacent pair, the cathode of the second self turn-off type semiconductor device of the one of the adjacent pair being connected to the anode of the first self turn-off type semiconductor device of the other of the adjacent pair.

4. The power converting apparatus according to claim 1, wherein each of the switch units has diodes connected in inverse-parallel with the first and second self turn-off type semiconductor devices.

5. The power converting apparatus according to claim 1, wherein the anode of the first self turn-off type semiconductor device of each switch unit is commonly connected to the anode of the second diode of the switch unit, the cathode of the second self turn-off type semiconductor device of each switch unit is commonly connected to the cathode of the first diode, and a reactor is connected in series to at least one of junctions between the anodes of the first self turn-off type semiconductor device and the second diode and between the cathodes of the second self turn-off type semiconductor device and the first diode.

6. The power converting apparatus according to claim 1, further comprising voltage restraint means, connected to each switch unit, for bypassing a current flowing to a corresponding capacitor when a voltage of the capacitor exceeds a predetermined value, thereby restraining increase of the voltage at the capacitor.

7. The power converting apparatus according to claim 1, wherein each of the first and second self turnoff type semiconductor devices consists of one of a self turn-off type semiconductor device of a reverse-blocking type and a self turn-off type semiconductor device of a reverse-conducting type.

8. The power converting apparatus according to claim 1, the conversion means comprises a positive-side switch unit and a negative-side switch unit which are provided corresponding to each phase of a polyphase AC, a common junction between the cathodes of the first diode and second self turn-off type semiconductor device of the positive-side switch unit is used as a DC-side terminal, a common junction between the anodes of the first self turn-off type semiconductor device and second diode of the positive-side switch unit being used as an AC-side terminal, and a common junction between the cathodes of the first diode and second self turn-off type semiconductor device of the negative side switch unit is used as an AC-side terminal, a common junction between the anodes of the first self turn-off type semiconductor device and second diode of the negative-side switch unit being used as a DC-side terminal.

9. The power converting apparatus according to claim 2, the conversion means comprises positive-side arm means and negative-side arm means which are provided corresponding to each phase of a polyphase AC, a junction between the anodes of the first self turn-off type semiconductor device and second diode of a switch unit located at the first end portion of the positive-side arm means is used as an AC-side terminal, a junction between the cathodes of the first diode and second self turn-off type semiconductor device of a switch unit located at the second end portion of the positive-side arm means being used as a DC-side terminal, and a junction between the anodes of the first self turn-off type semiconductor device and second diode of a switch unit located at the first end portion of the negative-side arm means is used as a DC-side terminal, a junction between the cathodes of the first diode and second self turn-off type semiconductor device of a switch unit located at the second end portion of the negative-side arm means being used as an AC-side terminal.

10. The power converting apparatus according to claim 3, the conversion means comprises positive-side arm means and negative-side arm means which are provided corresponding to each phase of a polyphase AC, a junction between the anodes of the first self turn-off type semiconductor device and second diode of a switch unit located at the first end portion of the positive-side arm means is used as an AC-side terminal, a junction between the cathodes of the first diode and second self turn-off type semiconductor device of a switch unit located at the second end portion of the positive-side arm means being used as a DC-side terminal, and a junction between the anodes of the first self turn-off type semiconductor device and second diode of a switch unit located at the first end portion of the negative-side arm means is used as a DC-side terminal, a junction between the cathodes of the first diode and second self turn-off type semiconductor device of a switch unit located at the second end portion of the negative-side arm means being used as an AC-side terminal.

11. The power converting apparatus according to claim 4, the conversion means comprises a positive-side switch unit and a negative-side switch unit which are provided corresponding to each phase of a polyphase AC, a common junction between the cathodes of the first diode and second self turn-off type semiconductor device of the positive-side switch unit is used as a DC-side terminal, a common junction between the anodes of the first self turn-off type semiconductor device and second diode of the positive-side switch unit being used as an AC-side terminal, and a common junction between the cathodes of the first diode and second self turn-off type semiconductor device of the negative-side switch unit is used as an AC-side terminal, a common junction between the anodes of the first self turn-off type semiconductor device and second diode of the negative-side switch unit being used as a DC-side terminal.

12. The power converting apparatus according to claim 4, wherein each of the first and second self turn-off type semiconductor devices consists of a self turn-off type semiconductor device of a reverse-blocking type.

13. The power converting apparatus according to claim 5, the conversion means comprises a positive-side switch unit and a negative-side switch unit which are provided corresponding to each phase of a polyphase AC, a common junction between the cathodes of the first diode and second self turn off type semiconductor device of the positive-side switch unit is used as a DC-side terminal, a common junction between the anodes of the first self turn-off type semiconductor device and second diode of the positive side switch unit being used as an AC-side terminal, a common junction between the cathodes of the first diode and second self turn-off type semiconductor device of the negative-side switch unit is used as an AC-side terminal, a common junction between the anodes of the first self turn-off type semiconductor device and second diode of the negative-side switch unit being used as a DC-side terminal, and the reactor is connected in series to one of the AC-side terminal and DC-side terminal of each of the switch units.

14. The power converting apparatus according to claim 6, wherein each of the first and second self turn-off type semiconductor devices consists of a self turn-off type semiconductor device of a reverse-conducting type.

15. The power converting apparatus according to claim 6, wherein the voltage restraint means includes a voltage restraint capacitor connected to the capacitor of each of the switch units for receiving charges of the capacitor when a voltage of the capacitor exceeds the predetermined value, and an absorption circuit for absorbing the charges accumulated in the voltage restraint capacitor.

16. The power converting apparatus according to claim 15, wherein the absorption circuit includes a DC/AC conversion circuit for converting a direct current into an alternate current, and converts the charges accumulated in the voltage restraint capacitor into an alternating current, thereby regenerating the resultant alternating current to a predetermined AC power source.

17. The power converting apparatus according to claim 15, wherein the absorption circuit includes a self turn-off semiconductor device and a resistor connected in series to each other between both opposite ends of the voltage restraint capacitor, the self turn-off semiconductor device of the absorption circuit being subjected to switching control such that a voltage at the voltage restraint capacitor will not exceed a predetermined value, and the resistor of the absorption circuit consuming electricity passing therethrough during the self turn-off semiconductor device being conductive.

18. The power converting apparatus according to claim 6, wherein the voltage restraint means has a non-linear resistor element connected to the capacitor of each of the switch units and having a characteristic in which its resistance is abruptly reduced when a voltage higher than a predetermined value is applied thereto.

19. The power converting apparatus according to claim 6, wherein the voltage restraint means includes three non-linear resistor elements forming a closed loop, each of the resistor elements having a characteristic in which its resistance is abruptly reduced when a voltage higher than a predetermined value is applied thereto, and having both opposite ends supplied with the voltage at the capacitor of each of the switch units.

* * * * *